United States Patent
Myers et al.

(10) Patent No.: US 11,321,767 B1
(45) Date of Patent: May 3, 2022

(54) CONFIGURING A COMPUTER SYSTEM BASED ON A PURCHASE ORDER

(71) Applicant: Palantir Technologies Inc., Palo Alto, CA (US)

(72) Inventors: Roman Myers, San Francisco, CA (US); Yiwei Gao, Palo Alto, CA (US); Mohammad Bukhari, Washington, DC (US); Jerry Sung, Palo Alto, CA (US); Drew Tuck, Palo Alto, CA (US); Cody Moore, Menlo Park, CA (US); Daniel Berkowitz, New York, NY (US); Joseph Makowski, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 11 days.

(21) Appl. No.: 16/723,216

(22) Filed: Dec. 20, 2019

Related U.S. Application Data

(60) Provisional application No. 62/882,655, filed on Aug. 5, 2019.

(51) Int. Cl.
  *G06Q 30/06* (2012.01)
  *G06Q 30/08* (2012.01)
  *G06Q 10/08* (2012.01)

(52) U.S. Cl.
  CPC ....... *G06Q 30/0637* (2013.01); *G06Q 10/087* (2013.01); *G06Q 10/0832* (2013.01); *G06Q 30/0611* (2013.01); *G06Q 30/08* (2013.01)

(58) Field of Classification Search
  CPC ..... G06Q 30/0601–0643; G06Q 30/08; G06Q 10/087

USPC ........................................................ 705/26.8
See application file for complete search history.

(56) References Cited

U.S. PATENT DOCUMENTS

| | | | |
|---|---|---|---|
| 2002/0069096 A1* | 6/2002 | Lindoerfer | G06Q 10/08 705/7.25 |
| 2005/0015305 A1* | 1/2005 | Agarwal | G06Q 30/0625 705/26.62 |
| 2017/0262422 A1* | 9/2017 | Tung | G06Q 30/06 |

OTHER PUBLICATIONS

Osmonbekov, Talai, Daniel C. Bello, and David I. Gilliland. "Adoption of electronic commerce tools in business procurement: enhanced buying center structure and processes." Journal of Business & Industrial Marketing (2002).*

(Continued)

*Primary Examiner* — Alexis M Casey
(74) *Attorney, Agent, or Firm* — Schwegman Lundberg & Woessner, P.A.

(57) ABSTRACT

Machine receives a notification that an order for a new item is being placed via an order form. Notification comprises an indication of a type of item being ordered. Order form comprises fields. Fields comprise type of item, item identifier, supplier identifier, price, payment method, and delivery location. Machine selects, based on the type of item being ordered, a first supplier bid from supplier bids stored in a bid data repository. Each supplier bid stored in the bid data repository comprises the item identifier, the supplier identifier, the price, and an expiration date. The item identifier of the first supplier bid corresponds to the type of item being ordered. Machine prepopulates, based on the first supplier bid, one or more fields of the order form. Machine submits the order based on the order form. Machine updates an inventory management data repository based on the delivery location and the item identifier.

17 Claims, 18 Drawing Sheets

(56) References Cited

OTHER PUBLICATIONS

Osmonbekov, Talai, Daniel C. Bello, and David I. Gilliland. "Adoption of electronic commerce tools in business procurement: enhanced buying center structure and processes." Journal of Business & Industrial Marketing (2002). (Year: 2002).*

* cited by examiner

HARDWARE REQUESTS

📖 CATALOG  🛒 VENDOR QUOTES  📋 PURCHASE ORDERS  ⚙ HARDWARE REQUESTS  🏢 INVENTORY  ⏏ LOGOUT

HARDWARE REQUESTS

OPEN
[CREATE]

SHIPPED

[LOAD]

⚙ CREATE NEW HARDWARE REQUEST  ✕

POC: OLIVER JONES
DEPLOYMENT: DOD
TICKET: TICKET #369
LEAD APPROVER: BENEDIC SMITH
SRE APPROVER: JOHN CRICHTON
PURCHASE TYPE: DISCRETIONARY  ◊
CATEGORY: PILOT  ◊
DIRECT TO CUSTOMER:

SUBMIT

BUILDSTATUS
NOT READY
TRACKING NUMBER

*FIG. 3A*

📖 CATALOG  🏷️ VENDOR QUOTES  📋 PURCHASE ORDERS  🔧 HARDWARE REQUESTS  🖥️ INVENTORY  ⎋ LOGOUT

HARDWARE REQUESTS

INTRINSICS   SHIPPED   RECEIVED        KMM 0   LAPTOP 0   RUGGEDIZED 0   SERVER 0   SWITCH 0   UPS 0   OTHER

WHO?
POC: OLIVER JONES
LEAD APPROVER: BENEDIC SMITH
SREAPPROVER: JOHN CRICHTON

WHAT?
EST. ACQUISITION PRICE: 0 USD
COSTMODIFIER:
0

TOTAL: 0

WHY?
DEPLOYMENT:
  DOD
  ✓

SELECT A SERVER

TICKET:
TICKET #369    ✏️

PURCHASE TYPE: DISCRETIONARY

CATEGORY: PILOT

*FIG. 3D*

RECEIVE HARDWARE REQUEST SHIPMENT ✕

RECEIVED DATE:
  TUE JUN 25 2019 00:00:00 GMT-0700(PACIFIC DAYLIGHT TIME)

SUBMIT

*FIG. 3G*

CREATE HARDWARE REQUEST SHIPMENT ✕

RECEIVER:
  BARTHOLOMEW BARNEY C/O DOD

DESTINATION:
  SECRET OFFICE

CARRIER:
  AIR FREIGHT EXPRESS

SERVICE:
  AIR EXPEDITED

TRACKING NUMBER:
  F23JEFW0DSFJ9DFS

SHIP DATE:
  TUE JUN 18 2019 00:00:00 GMT-0700 (PACIFIC DAYLIGHT TIME)

SUBMIT

*FIG. 3H*

📖 CATALOG  🛒 VENDOR QUOTES  📋 PURCHASE ORDERS  🔧 HARDWARE REQUESTS  🖥 INVENTORY  ⇤ LOGOUT

INVENTORY | 123 MAIN ST | CREATE LOCATION 🔍  ⇧

COMPONENTS

KMM
COOL KEYBOARD (QUANTITY: 0)
COOL MOUSE (QUANTITY: 0)
ABC MOUSE (QUANTITY 1)

SERVER
A123 COIN MINDER 2 (QUANTITY: 0)
ABC SERVER (QUANTITY: 0)

RAM
ABC RAM (QUANTITY: 3)
DEF RAM (QUANTITY: 0)

CPU
COOL (QUANTITY: 0)
ABC CPU (QUANTITY: 0)

HARD DRIVE
HARD (QUANTITY: 0)
ABC STORAGE (QUANTITY: 0)

*FIG. 3J*

| CATALOG | ⛬ VENDOR QUOTES | 🗐 PURCHASE ORDERS | ⚙ HARDWARE REQUESTS | 🏢 INVENTORY | ⮕ LOGOUT |

CATALOG   NEW SERVER TYPE   NEW TYPE

KMM 0   LAPTOP 0   RUGGEDIZED 0   SWITCH 0   UPS 0   | SERVER 4 |   RAM 2   CPU 2   HARD DRIVE 2

A123 COIN MINDER 2        UPDATE SPEC
4567 COIN MINDER           UPDATE SPEC
SERVER WITH MOUSE     UPDATE SPEC
EXCEPTIONAL SERVER   UPDATE SPEC

*FIG. 3K*

CATALOG | VENDOR QUOTES | PURCHASE ORDERS | HARDWARE REQUESTS | INVENTORY | LOGOUT

CATALOG

KMM 3   LAPTOP 0

HARD

EXCEPTIONAL STOR

CREATE NEW SERVER SPECIFICATION ✕

NAME:
EXCEPTIONAL SERVER

COMPONENTS:
AVERAGE RAM 1
EXCEPTIONAL CPU 1  ✕
EXCEPTIONAL STORAGE 1  ✕

EXCEPTIONAL STORAGE 1  ✕

NEW                    ⇔  [ ADD ]

*FIG. 3L*

VENDOR QUOTE

RECEIVE VENDOR QUOTE

QUOTE NUMBER:
QUOTE #9001

DESCRIPTION:
FOR THE ABC CONTRACT

CREATION DATE:
SAT JUN 01 2019 00:00:00 GMT-0700 (PACIFIC DAYLIGHT TIME)

EXPIRATION DATE:
SAT JUN 30 2019 00:00:00 GMT-0700 (PACIFIC DAYLIGHT TIME)

BEN BITDIDDLE

LINE ITEMS
SERVER $100 1 ⊗
MOUSE $10 1 ⊗

ADD BY LINE ITEM   CREATE A LINE ITEM
LINE ITEM
  SELECT A LINE ITEM
  - EXCELERON RAM
  - SUPERFLY BUNDLE
  - EXCELLENT MONITOR
  - EXCELERON SERVER
  - MAK BUNDLE
  - MOUSE

TOTAL PRICE:

ACTIONS
[OPEN]
[OPEN]
[OPEN]
[OPEN]

INVENTORY   LOGOUT

*FIG. 3M*

LINE ITEMS ✕

ADD BY LINE ITEM   <u>CREATE A LINE ITEM</u>

LINE ITEM
NAME:
  EXCELERON SERVER
COMPONENTS
ABC SERVER - 1     ⊗

———————————————

SELECT A COMPONENT

QUANTITY:
1

PRICE:
| 100 |

ADD LINE ITEM

FIG. 3N

PURCHASE ORDERS

□ CATALOG  🛒 VENDOR QUOTES  📋 PURCHASE ORDERS  🔧 HARDWARE REQUESTS  🗄 INVENTORY  ⇤ LOGOUT

ORDERED

| ACTIONS | | | TICKET | VENDOR | DESTINATION |
|---|---|---|---|---|---|
| ✎ OPEN | SHIP ▶ | | 370 | BEN BITDIDDLE | 123 MAIN STREET |
| ✎ OPEN | SHIP ▶ | | 731 | ABC TECHNOLOGIES | |
| ✎ OPEN | SHIP ▶ | | 173 | | |

CREATE

SHIPPED

| ACTIONS | | | TICKET | VENDOR | DESTINATION |
|---|---|---|---|---|---|

RECEIVED

| ACTIONS | | TICKET | VENDOR | DESTINATION | TRACKING NUMBER | RECEIVE DATE |
|---|---|---|---|---|---|---|
| ✎ OPEN | CLOSE ▶ | EXCEPTIONAL TICKET | BEN BITDIDDLE | 123 MAIN ST | | TUE JUN 11 2019 |
| ✎ OPEN | CLOSE ▶ | ABC TICKET TEST | BEN BITDIDDLE | 123 MAIN ST | | TUE JUN 18 2019 |
| ✎ OPEN | CLOSE ▶ | TEST | BEN BITDIDDLE | 123 MAIN ST | | TUE JUNE 04 2019 |

LOAD CLOSED

*FIG. 30*

VENDOR QUOTES    OPEN

| ACTIONS | VENDOR | QUOTE NUMBER | CREATION DATE | DESCRIPTION |
|---|---|---|---|---|
| OPEN | BEN BITDIDDLE | 9001 | MON MAY 06 2019 | DESCRIPTION 1 |
| OPEN | BEN BITDIDDLE | 9011 | MON MAY 06 2019 | DESCRIPTION 2 |
| OPEN | ABC TECHNOLOGIES | 1099 | WED MAY 08 2019 | DESCRIPTION 3 |
| OPEN | BEN BITDIDDLE | 9109 | TUE JUN 04 2019 | DESCRIPTION 4 |
| OPEN | BEN BITDIDDLE | 1019 | SAT JUN 01 2019 | DESCRIPTION 5 |

FIG. 3P

| CATALOG  VENDOR QUOTES  PURCHASE ORDERS  HARDWARE REQUESTS  INVENTORY  LOGOUT

123 MAIN ST | CREATE LOCATION 🔍

⇧

INVENTORY

COMPONENTS

KMM

COOL KEYBOARD (QUANTITY: 0)
COOL MOUSE (QUANTITY: 0)
EXCEPTIONAL MOUSE (QUANTITY: 1)

SERVER

A123 COIN MINDER 2 (QUANTITY: 0)
EXCEPTIONAL SERVER (QUANTITY: 0)

RAM

EXCEPTIONAL RAM (QUANTITY: 3)

CPU

COOL (QUANTITY: 0)

HARD DRIVE

HARD (QUANTITY: 0)

UNIQUE SERVERS

EXCEPTIONAL SERVER (QUANTITY: 1)
PTJQ43AD HOSTNAME: EXCEPTIONAL

*FIG. 3Q*

| CATALOG | VENDOR QUOTES | PURCHASE ORDERS | HARDWARE REQUESTS | INVENTORY | LOGOUT |

PURCHASE ORDER

VENDOR: BEN BITDIDDLE
ABC TICKET: EXCEPTIONAL TICKET

| LINE ITEM | QUANTITY |
|---|---|
| EXCELERON SERVER | 1 |
| MOUSE | 1 |

NOTES: EXCEPTIONAL ORDER
SUBTOTAL: 110 USD
DESTINATION: 123 MAIN ST
DEPLOYMENT: ABC
ORDER DATE: FRI JUN 07 2019 00:00:00 GMT-0700 (PACIFIC DAYLIGHT TIME)
TRACKING NUMBER: U2390ERWU90EWU90
RECEIVE DATE: TUE JUN 11 2019 00:00:00 GMT-0700 (PACIFIC DAYLIGHT TIME)
SIGNER: SHERRY JUNG

*FIG. 3R*

CONFIGURING A COMPUTER SYSTEM BASED ON A PURCHASE ORDER

PRIORITY CLAIM

This application claims priority to U.S. Provisional Patent Application No. 62/882,655, filed on Aug. 5, 2019, entitled "CONFIGURING A COMPUTER SYSTEM BASED ON A PURCHASE ORDER," the entire content of which is incorporated herein by reference.

TECHNICAL FIELD

The subject matter disclosed herein relates to configuration of a computer system. In particular, example embodiments may relate to configuring a computer system based on a purchase order.

BACKGROUND

A large organization, such as a department store chain, a natural resource excavator, a government department with multiple geographic locations, a wealthy family with multiple homes, and the like, may have to manage a large amount of inventory items. The inventory items are typically ordered for suppliers in response to bids by the suppliers, combined with one another, moved from one geographic location to another, and the like. Techniques for keeping track of all of the inventory items may be desirable.

BRIEF DESCRIPTION OF THE DRAWINGS

Various ones of the appended drawings merely illustrate example embodiments of the present inventive subject matter and cannot be considered as limiting its scope.

SUMMARY

Figure 1:
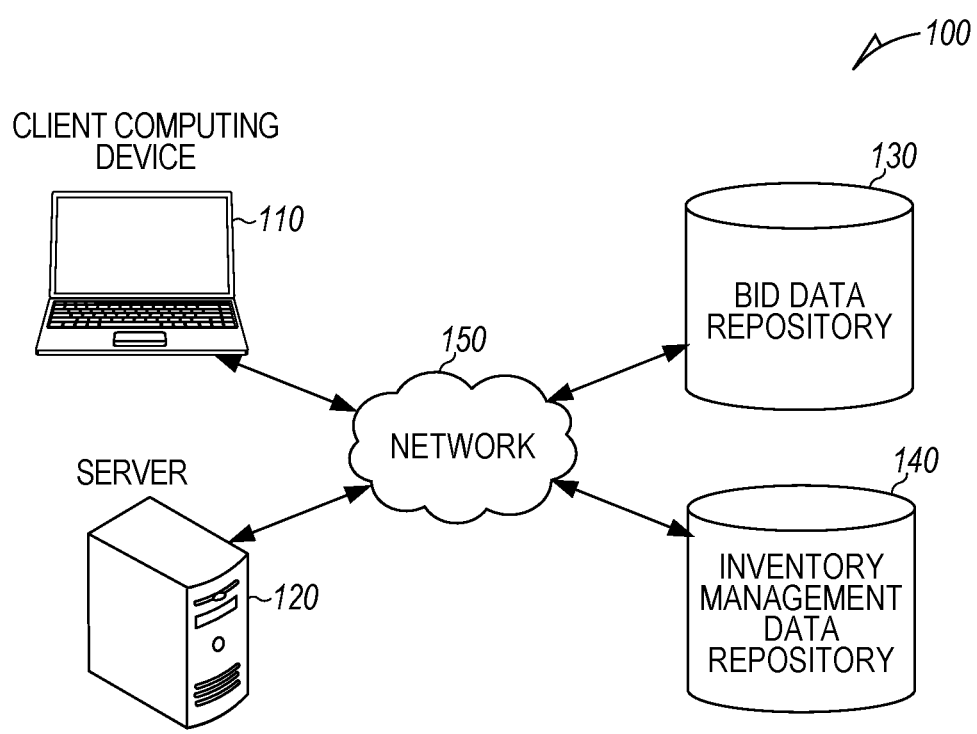
FIG. 1 is a block diagram of an example system in which configuring a computer system based on a purchase order may be implemented, according to some embodiments.

The present disclosure generally relates to machines that configure a computer system based on a purchase order, including computerized variants of such special-purpose machines and improvements to such variants, and to the technologies by which such special-purpose machines become improved compared to other special-purpose machines that provide technology for configuring a computer system based on a purchase order. In particular, the present disclosure addresses systems and methods for configuring a computer system based on a purchase order.

According to some aspects, a method includes: receiving a notification that an order for a new item is being placed via an order form at a client computing device, wherein the notification comprises at least an indication of a type of item being ordered, wherein the order form comprises a plurality of fields, wherein the plurality of fields comprise at least the type of item, an item identifier, a supplier identifier, a price, a payment method, and a delivery location; selecting, based on the type of item being ordered, a first supplier bid from a plurality of supplier bids stored in a bid data repository, wherein each supplier bid stored in the bid data repository comprises at least the item identifier, the supplier identifier, the price, and an expiration date, wherein the item identifier of the first supplier bid corresponds to the type of item being ordered; prepopulating, based on the first supplier bid, one or more fields of the order form at the client computing device; submitting the order based on the order form; and updating, upon determining that a delivery for the order has been completed, an inventory management data repository based on at least the delivery location and the item identifier.

Other aspects include a machine-readable medium storing instructions to perform the above method and a system including processing hardware and memory, the processing hardware to perform the above method.

DETAILED DESCRIPTION

Reference will now be made in detail to specific example embodiments for carrying out the disclosed subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 is a block diagram of an example system 100 in which configuring a computer system based on a purchase order may be implemented, according to some embodiments. As shown, the system 100 includes a client computing device 110, a server 120, a bid data repository 130, and an inventory management data repository 140 connected to a network 150. The network 150 may include one or more of the internet, an intranet, a local area network, a wide area network, a virtual private network (VPN), and the like. While a single one of each of the client computing device 110, the server 120, the bid data repository 130, and the inventory management data repository 140 is illustrated, the technology may be implemented with either a single or multiple ones of the client computing device 110, the server 120, the bid data repository 130, and the inventory management data repository 140. In some cases, a single machine performs the functions of two or more of the client computing device 110, the server 120, the bid data repository 130, and the inventory management data repository 140.

The client computing device 110 may include one or more of a laptop computer, a desktop computer, a mobile phone, a tablet computer, a smart watch, a digital music player, a smart television, and the like. The client computing device 110 is configured to display a graphical user interface (GUI), such as the GUIs shown in FIGS. 3A-3R, to a user and to receive input, via the GUI and/or an input device (e.g., touch screen, keyboard, mouse, and the like) from the user.

The server includes processing hardware and memory. The server 120 receives input, via the network 150, from one or more client computing devices 110. The server accesses data from the bid data repository 130 and the inventory management data repository 140. The server 120 manipulates the accessed data, stores the results of the manipulation in the bid data repository 130 and the inventory management data repository 140. The server 120 provides an output to the client computing device 110 for display thereat. More details of examples of the function of the server 120, and its interoperation with the bid data repository 130 and the inventory management data repository 140 are discussed in conjunction with FIG. 2.

The bid data repository 130 may be implemented as a database or any other data storage unit. Similarly, the inventory management data repository 140 may be implemented as a database or any other data storage unit. In some cases, a single data storage unit functions as both the bid data repository 130 and the inventory management data repository 140.

As shown, the server 120 communicates with the bid data repository 130 and the inventory management data repository 140 via the network 150. However, in some embodiments, the server may have a direct non-network connection to the bid data repository 130 and/or the inventory management data repository 140. The direct non-network connection may be a wired or wireless connection.

In some embodiments, the server 120 is directly connected to the bid data repository 130 via a first data connection. The server 120 is directly connected to the inventory management data repository 140 via a second data connection. The server is connected to the client computing device 110 via the network 150. The first data connection and the second data connection do not pass through the network 150.

According to some aspects, the server 120 receives supplier bids offering to sell items to an organization associated with the client computing device 110. The organization may be, for example, an employer of a user of the client computing device 110. Each bid includes an item identifier, a price (e.g. per unit), and an expiration date. The bids are stored in the bid data repository 130 until their expiration dates. Upon reaching its expiration date, a given bid may be removed (e.g., by the server 120) from the bid data repository 130. In some cases, a given bid might not be removed from the bid data repository 130 upon reaching its expiration date, as suppliers might still honor bids for procuring goods with stable prices after the expiration date has passed. The server 120 receives a notification that an order for a new item (or multiple new items) is being placed via an order form at the client computing device 110. The notification includes at least an indication of a type of item being ordered. The order form includes multiple fields. The fields include at least the type of item, the item identifier, the supplier identifier, the price, a payment method, and a delivery location.

The server 120 selects a first supplier bid for the order. The item identifier of the first supplier bid corresponds to the type of item. If there are multiple bids where the item identifier corresponds to the type of item, other criteria, such as the price per unit or the delivery time, may be used to select the first supplier bid. The server 120 prepopulates, based on the first supplier bid, one or more fields of the order form at the client computing device 110. The user of the client computing device 110 fills out the order form at the client computing device 110. The server 120 submits the order based on the completed order form. When the delivery for the order is completed, the server 120 may update the inventory management data repository 140 based on at least the delivery location and the item identifier.

Figure 2:
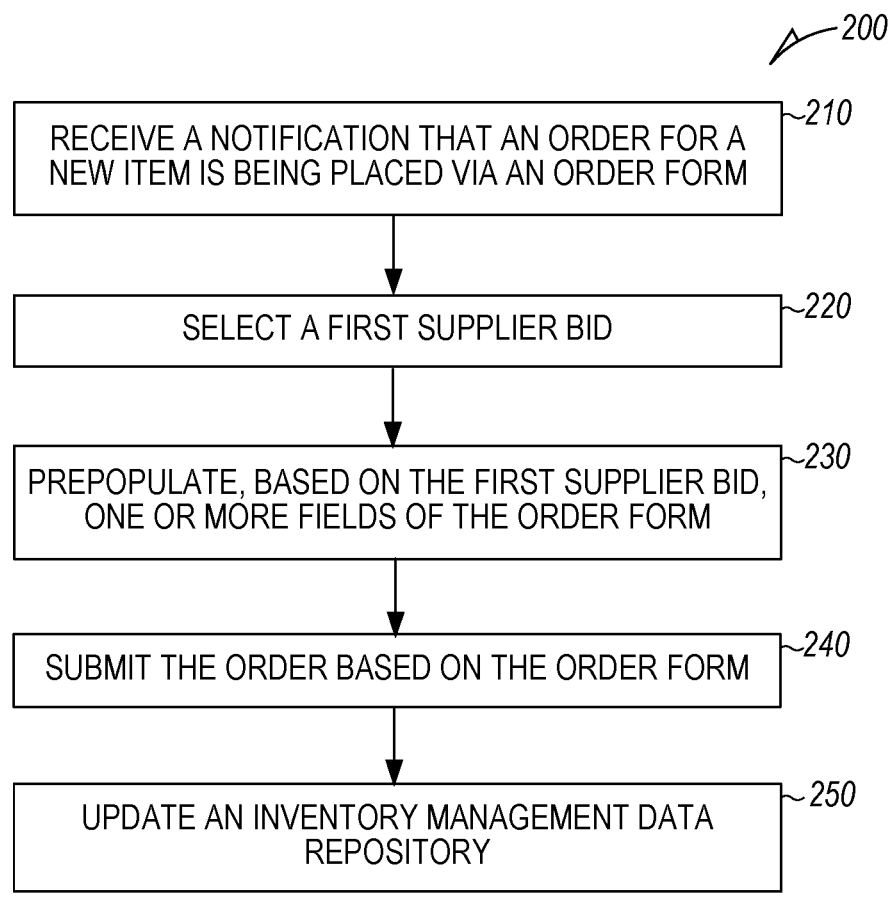
FIG. 2 is a flow chart illustrating an example method for configuring a computer system based on a purchase order, according to some embodiments.

FIG. 2 is a flow chart illustrating an example method 200 for configuring a computer system based on a purchase order, according to some embodiments. The method 200 may be implemented at the server 120.

Prior to (or simultaneously with) implementing the method 200, the server 120 receives a plurality of supplier bids. The server 120 stores the plurality of supplier bids in the bid data repository 130.

At operation 210, the server 120 receives a notification that an order for a new item is being placed via an order form at the client computing device 110. The notification comprises at least an indication of a type of item being ordered. The order form comprises a plurality of fields. The plurality of fields comprise at least the type of item, an item identifier, a supplier identifier, a price, a payment method, and a delivery location.

At operation 220, the server 120 selects, based on the type of item being ordered, a first supplier bid from a plurality of supplier bids stored in the bid data repository 130. Each supplier bid stored in the bid data repository 130 comprises at least the item identifier, the supplier identifier, the price, and an expiration date. The item identifier of the first supplier bid corresponds to the type of item being ordered. In some cases, the bid data repository 130 is ensured to have currently valid bids. If a bid in the bid data repository 130 reaches or is past its expiration date, the bid is removed from the data repository 130.

At operation 230, the server 120 prepopulates, based on the first supplier bid, one or more fields of the order form at the client computing device 110. The prepopulated fields may include at least one of the item identifier, the supplier identifier, and/or the price. The user of the client computing device 110 may approve the prepopulated fields and fill out additional fields that were not prepopulated. The additional fields may include, for example, the payment method and/or the delivery location. Alternatively, the user may edit one or more of the prepopulated fields.

At operation 240, the server 120 submits the order based on the order form. For example, the server 120 may email or fax the order form to the supplier. Alternatively, the supplier may provide, to the server 120, a mechanism for automatically submitting orders, and the server 120 may submit the order according to the mechanism. The mechanism may be identified from a selectable link in the order form or metadata of the order form. The metadata may reside in a header of the order form.

At operation 250, the server 120 updates, upon determining that a delivery for the order has been completed, the inventory management data repository 140 based on at least the delivery location and the item identifier.

In some cases, the server 120 receives an indication that a first item residing at the delivery location is to be combined with a second item residing at the delivery location. For example, a desktop computer tower may be combined with a monitor to create a work station (that includes both the desktop computer tower and the monitor). In response, the first item and the second item may be removed from the inventory management data repository 140. The server creates, in the inventory management data repository 140, a combined item (e.g. work station with ID #123) that includes both the first item (e.g. monitor with ID #456) and the second item (e.g. desktop computer tower with ID #789).

The server 120 may receive a search request for a given item type (e.g. monitor) from the inventory management data repository 140, where the given item type is associated with the first item and is not associated with the combined item. The server 120 provides neither the first item (e.g. monitor with ID #456) nor the combined item (e.g. work station with ID #123) as a search result based on the first item having been combined with the second item into the combined item.

FIGS. 3A-3R illustrate example graphical user interfaces for configuring a computer system based on a purchase order, according to some embodiments. The graphical user interfaces of FIGS. 3A-3R may be presented at the client computing device 110 based on its interaction with the server 120 and/or to support its interaction with the server 120.

Figure 3B:
FIGS. 3A-3R illustrate example graphical user interfaces for configuring a computer system based on a purchase order, according to some embodiments.
Figure 3C:
Figure 3E:
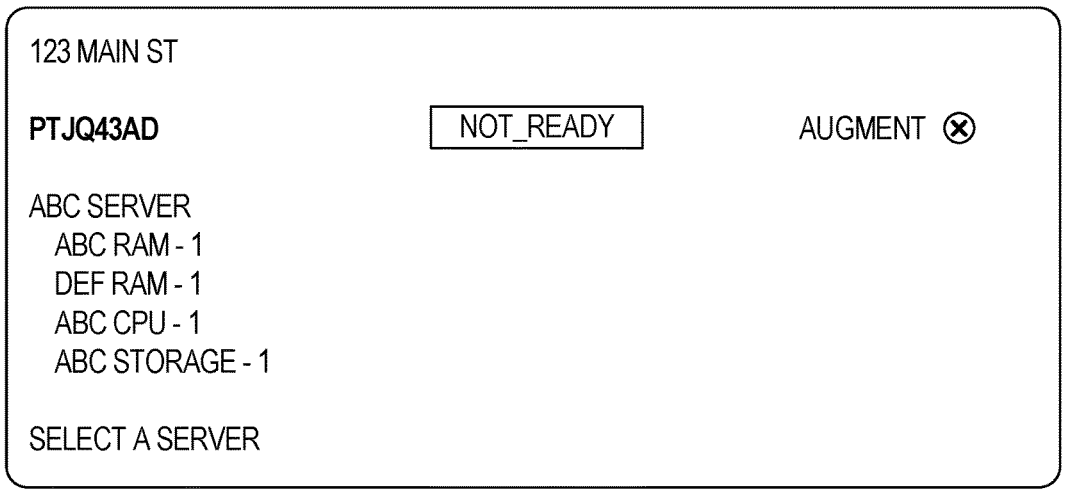
Figure 3F:
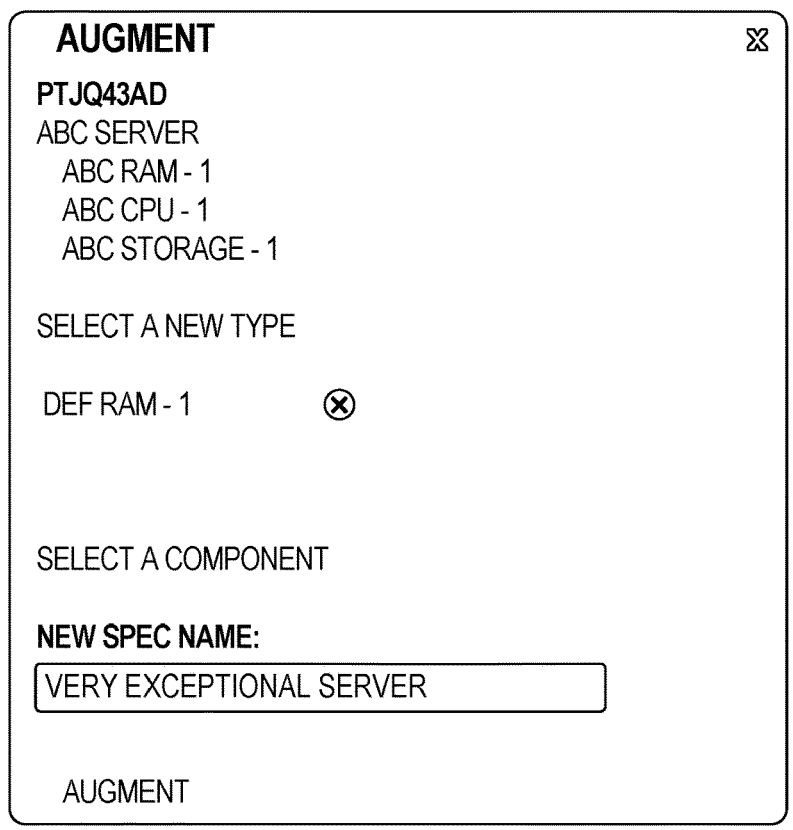
Figure 3I:
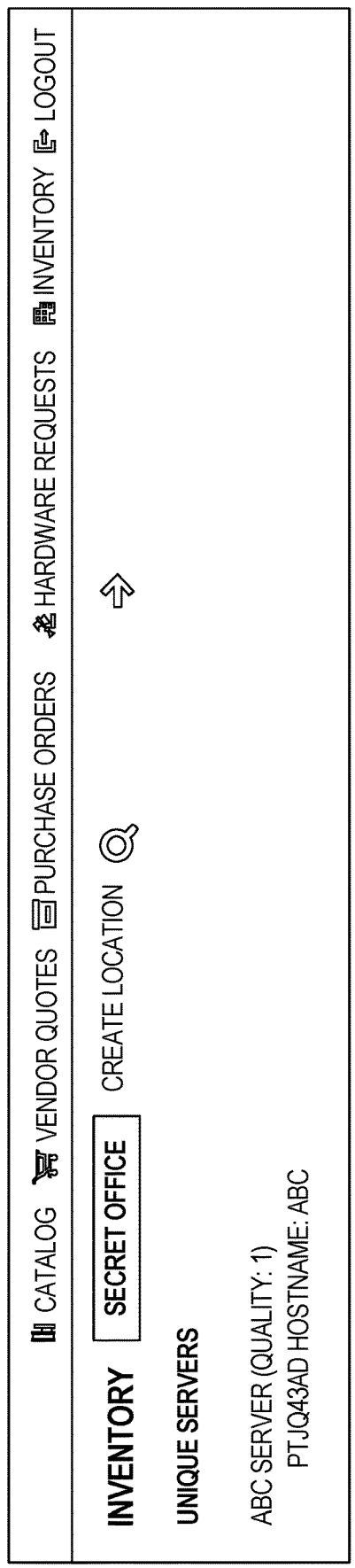

FIG. 3A illustrates an example create new hardware request. FIG. 3B illustrates an example interface for creating a new location. FIG. 3C illustrates an example GUI representing an inventory item, called "ABC Server" that includes the components: "ABC RAM," "ABC CPU," and "ABC Storage." In FIG. 3C, the "ABC Server" is a member of a list of inventory items. FIG. 3D illustrates an example hardware request. FIG. 3E illustrates an example GUI representing an inventory item, called "ABC Server" that includes the components: "ABC RAM," "ABC CPU," and "ABC Storage." FIG. 3F illustrates an example augmenting interface. FIG. 3G illustrates an example receive hardware request shipment. FIG. 3H illustrates an example create hardware request shipment. FIG. 3I illustrates a first example inventory for a location. FIG. 3J illustrates a second example inventory for a location. FIG. 3K illustrates an example catalog. FIG. 3L illustrates an example create new server specification. FIG. 3M illustrates an example receive vendor quote request. FIG. 3N illustrates an example interface for creating a line item. FIG. 3O illustrates example purchase orders. FIG. 3P illustrates example vendor quotes. FIG. 3Q illustrates an example inventory for a location. FIG. 3R illustrates an example purchase order.

Figure 4:
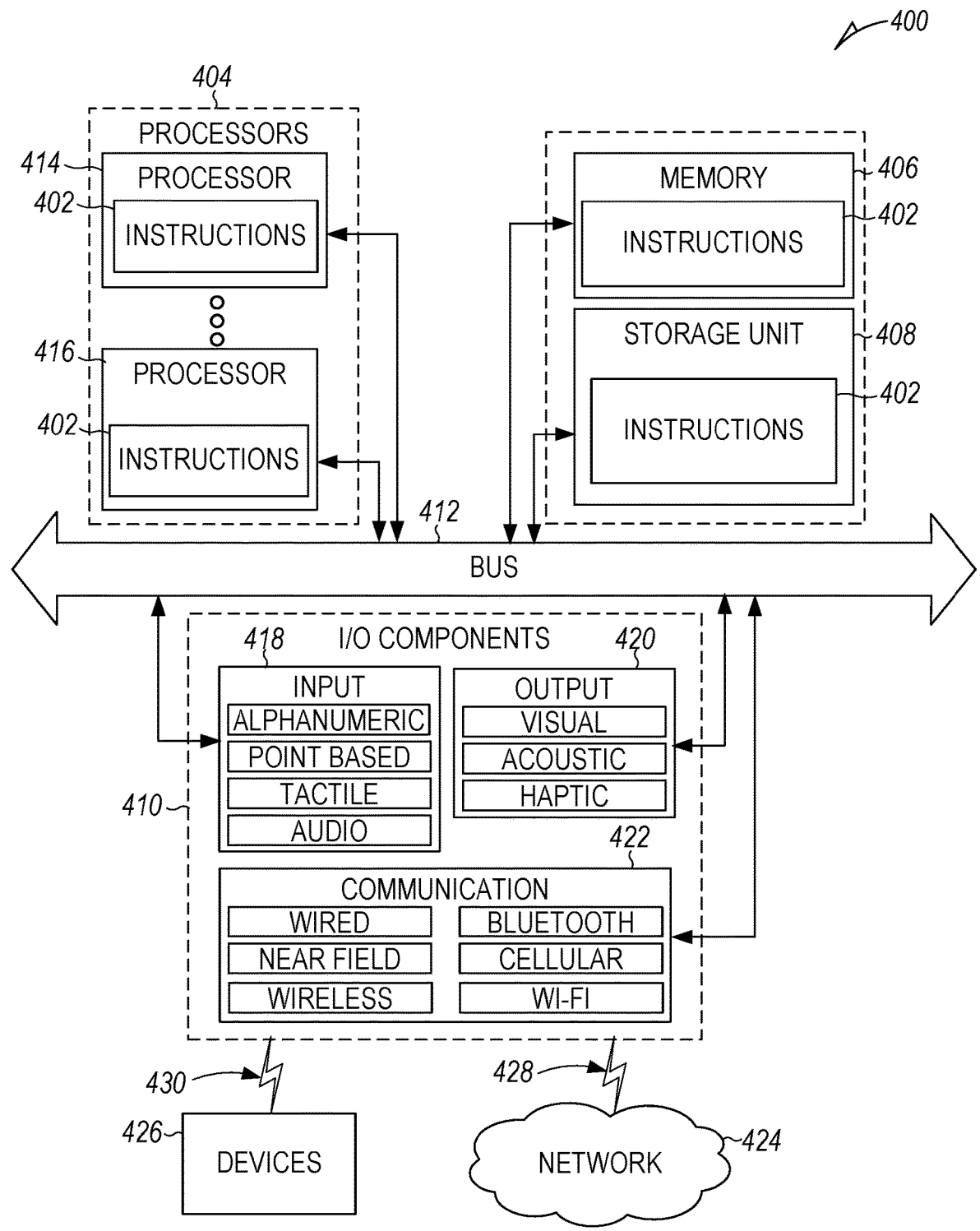
FIG. 4 is a block diagram illustrating components of a machine able to read and execute instructions from a machine-readable medium that cause the machine to perform any one or more of the methodologies discussed herein, according to some embodiments.

FIG. 4 is a block diagram illustrating components of a machine 400, according to some example embodiments, able to read instructions from a machine-readable medium (e.g., a machine-readable storage medium) and perform any one or more of the methodologies discussed herein. The machine 400 may correspond to one or more of the administrator client device 110, the application client device 120, the administrator server 130, and the application server 140. Specifically, FIG. 4 shows a diagrammatic representation of the machine 400 in the example form of a system, within which instructions 402 (e.g., software, a program, an application, an applet, an app, a driver, or other executable code) for causing the machine 400 to perform any one or more of the methodologies discussed herein may be executed. For example, the instructions 402 include executable code that causes the machine 400 to execute the methods 200 or 300. In this way, these instructions transform the general, non-programmed machine into a particular machine programmed to carry out the described and illustrated functions in the manner described herein. The machine 400 may operate as a standalone device or may be coupled (e.g., networked) to other machines.

By way of non-limiting example, the machine 400 may comprise or correspond to a television, a computer (e.g., a server computer, a client computer, a personal computer (PC), a tablet computer, a laptop computer, or a netbook), a set-top box (STB), a personal digital assistant (PDA), an entertainment media system (e.g., an audio/video receiver), a cellular telephone, a smart phone, a mobile device, a wearable device (e.g., a smart watch), a portable media player, or any machine capable of outputting audio signals and capable of executing the instructions 402, sequentially or otherwise, that specify actions to be taken by machine 400. Further, while only a single machine 400 is illustrated, the term "machine" shall also be taken to include a collection of machines 400 that individually or jointly execute the instructions 402 to perform any one or more of the methodologies discussed herein.

The machine 400 may include processors 404, memory 406, storage unit 408 and I/O components 410, which may be configured to communicate with each other such as via a bus 412. In an example embodiment, the processors 404 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 414 and processor 416 that may execute instructions 402. The term "processor" is intended to include multi-core processors that may comprise two or more independent processors (sometimes referred to as "cores") that may execute instructions contemporaneously. Although FIG. 4 shows multiple processors, the machine 400 may include a single processor with a single core, a single processor with multiple cores (e.g., a multi-core process), multiple processors with a single core, multiple processors with multiples cores, or any combination thereof.

The memory 406 (e.g., a main memory or other memory storage) and the storage unit 408 are both accessible to the processors 404 such as via the bus 412. The memory 406 and the storage unit 408 store the instructions 402 embodying any one or more of the methodologies or functions described herein. The instructions 402 may also reside, completely or partially, within the memory 406, within the storage unit 408, within at least one of the processors 404 (e.g., within the processor's cache memory), or any suitable combination thereof, during execution thereof by the machine 400. Accordingly, the memory 406, the storage unit 408, and the memory of processors 404 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), or any suitable combination thereof. The term "machine-readable medium" should be taken to include a single medium or multiple media (e.g., a centralized or distributed database, or associated caches and servers) able to store instructions 402. The term "machine-readable medium" shall also be taken to include any medium, or combination of multiple media, that is capable of storing instructions (e.g., instructions 402) for execution by a machine (e.g., machine 400), such that the instructions, when executed by one or more processors of the machine 400 (e.g., processors 404), cause the machine 400 to perform any one or more of the methodologies described herein (e.g., methods 200 and 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 410 may include a wide variety of components to receive input, provide output, produce output, transmit information, exchange information, capture measurements, and so on. The specific I/O components 410 that are included in a particular machine will depend on the type of machine. For example, portable machines such as mobile phones will likely include a touch input device or other such input mechanisms, while a headless server machine will likely not include such a touch input device. It will be appreciated that the I/O components 410 may include many other components that are not specifically shown in FIG. 4. The I/O components 410 are grouped according to functionality merely for simplifying the following discussion and the grouping is in no way limiting. In various example embodiments, the I/O components 410 may include input components 418 and output components 420. The input components 418 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components, and the like. The output components 420 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 410 may include communication components 422 operable to couple the machine 400 to a network 424 or devices 426 via coupling 428 and coupling 430, respectively. For example, the communication components 422 may include a network interface component or other suitable device to interface with the network 424. In further examples, communication components 422 may include wired communication components, wireless communication components, cellular communication components, near field communication (NFC) components, Bluetooth® components (e.g., Bluetooth® Low Energy), WiFi® components, and other communication components to provide communication via other modalities. The devices 426 may be another machine or any of a wide variety of peripheral devices (e.g., a peripheral device coupled via a Universal Serial Bus (USB)).

NUMBERED EXAMPLES

Certain embodiments are described herein as numbered examples 1, 2, 3, etc. These numbered examples are provided as examples only and do not limit the technology disclosed herein.

Example 1 is a system comprising: processing hardware of a server; and a memory storing instructions which, when executed by the processing hardware, cause the processing hardware to perform operations comprising: receiving a notification that an order for a new item is being placed via an order form at a client computing device, wherein the notification comprises at least an indication of a type of item being ordered, wherein the order form comprises a plurality of fields, wherein the plurality of fields comprise at least the type of item, an item identifier, a supplier identifier, a price, a payment method, and a delivery location; selecting, based on the type of item being ordered, a first supplier bid from a plurality of supplier bids stored in a bid data repository, wherein each supplier bid stored in the bid data repository comprises at least the item identifier, the supplier identifier, the price, and an expiration date, wherein the item identifier of the first supplier bid corresponds to the type of item being ordered; prepopulating, based on the first supplier bid, one or more fields of the order form at the client computing device; submitting the order based on the order form; and updating, upon determining that a delivery for the order has been completed, an inventory management data repository based on at least the delivery location and the item identifier.

In Example 2, the subject matter of Example 1 includes, the operations further comprising: receiving the plurality of supplier bids; and storing, in the bid data repository, the plurality of supplier bids.

In Example 3, the subject matter of Examples 1-2 includes, the operations further comprising: receiving input representing that a first item residing at the delivery location is to be combined with a second item residing at the delivery location; removing, from the inventory management data repository, the first item and the second item in response to the input; creating, in the inventory management data repository, a combined item that comprises both the first item and the second item, wherein a data structure for the combined item comprises a data substructure for the first item and a data substructure for the second item.

In Example 4, the subject matter of Example 3 includes, the operations further comprising: receiving, at the processing hardware, a search request for a given item type from the inventory management data repository, wherein the given item type is associated with the first item, and wherein the given item type is not associated with the combined item; and providing neither the first item nor the combined item as a search result to the search request based on the first item having been combined with the second item into the combined item.

In Example 5, the subject matter of Examples 1-4 includes, the operations further comprising: determining that an expiration date for a given bid has passed; and removing, from the bid data repository, the given bid.

In Example 6, the subject matter of Examples 1-5 includes, wherein prepopulating, based on the first supplier bid, the one or more fields of the order form at the client computing device comprises prepopulating at least one of the item identifier, the supplier identifier, and the price, the operations further comprising: receiving, from the client computing device, an indication of approval of the prepopulated fields; and receiving, from the client computing device, a value input for at least one field that was not prepopulated.

In Example 7, the subject matter of Example 6 includes, wherein the at least one field that was not prepopulated comprises the payment method or the delivery location.

In Example 8, the subject matter of Examples 1-7 includes, wherein the server is directly connected to the bid data repository via a first data connection, wherein the server is directly connected to the inventory management data repository via a second data connection, wherein the server is connected to the client computing device via an external network, and wherein the first data connection and the second data connection do not pass through the external network.

Example 9 is a non-transitory machine-readable medium storing instructions which, when executed by a machine, cause the machine to perform operations comprising: receiving a notification that an order for a new item is being placed via an order form at a client computing device, wherein the notification comprises at least an indication of a type of item being ordered, wherein the order form comprises a plurality of fields, wherein the plurality of fields comprise at least the type of item, an item identifier, a supplier identifier, a price, a payment method, and a delivery location; selecting, based on the type of item being ordered, a first supplier bid from a plurality of supplier bids stored in a bid data repository, wherein each supplier bid stored in the bid data repository comprises at least the item identifier, the supplier identifier, the price, and an expiration date, wherein the item identifier of the first supplier bid corresponds to the type of item being ordered; prepopulating, based on the first supplier bid, one or more fields of the order form at the client computing device; submitting the order based on the order form; and updating, upon determining that a delivery for the order has been completed, an inventory management data repository based on at least the delivery location and the item identifier.

In Example 10, the subject matter of Example 9 includes, the operations further comprising: receiving the plurality of supplier bids; and storing, in the bid data repository, the plurality of supplier bids.

In Example 11, the subject matter of Examples 9-10 includes, the operations further comprising: receiving input representing that a first item residing at the delivery location is to be combined with a second item residing at the delivery location; removing, from the inventory management data repository, the first item and the second item in response to the input; creating, in the inventory management data repository, a combined item that comprises both the first item and the second item, wherein a data structure for the combined item comprises a data substructure for the first item and a data substructure for the second item.

In Example 12, the subject matter of Example 11 includes, the operations further comprising: receiving a search request for a given item type from the inventory management data repository, wherein the given item type is associated with the first item, and wherein the given item type is not associated with the combined item; and providing neither the first item nor the combined item as a search result to the search request based on the first item having been combined with the second item into the combined item.

In Example 13, the subject matter of Examples 9-12 includes, the operations further comprising: determining that an expiration date for a given bid has passed; and removing, from the bid data repository, the given bid.

In Example 14, the subject matter of Examples 9-13 includes, wherein prepopulating, based on the first supplier bid, the one or more fields of the order form at the client computing device comprises prepopulating at least one of the item identifier, the supplier identifier, and the price, the operations further comprising: receiving, from the client computing device, an indication of approval of the prepopulated fields; and receiving, from the client computing device, a value input for at least one field that was not prepopulated.

In Example 15, the subject matter of Example 14 includes, wherein the at least one field that was not prepopulated comprises the payment method or the delivery location.

In Example 16, the subject matter of Examples 9-15 includes, wherein the server is directly connected to the bid data repository via a first data connection, wherein the server is directly connected to the inventory management data repository via a second data connection, wherein the server is connected to the client computing device via an external network, and wherein the first data connection and the second data connection do not pass through the external network.

Example 17 is a method comprising: receiving a notification that an order for a new item is being placed via an order form at a client computing device, wherein the notification comprises at least an indication of a type of item being ordered, wherein the order form comprises a plurality of fields, wherein the plurality of fields comprise at least the type of item, an item identifier, a supplier identifier, a price, a payment method, and a delivery location; selecting, based on the type of item being ordered, a first supplier bid from a plurality of supplier bids stored in a bid data repository, wherein each supplier bid stored in the bid data repository comprises at least the item identifier, the supplier identifier, the price, and an expiration date, wherein the item identifier of the first supplier bid corresponds to the type of item being ordered; prepopulating, based on the first supplier bid, one or more fields of the order form at the client computing device; submitting the order based on the order form; and updating, upon determining that a delivery for the order has been completed, an inventory management data repository based on at least the delivery location and the item identifier.

In Example 18, the subject matter of Example 17 includes, receiving the plurality of supplier bids; and storing, in the bid data repository, the plurality of supplier bids.

In Example 19, the subject matter of Examples 17-18 includes, receiving input representing that a first item residing at the delivery location is to be combined with a second item residing at the delivery location; removing, from the inventory management data repository, the first item and the second item in response to the input; creating, in the inventory management data repository, a combined item that comprises both the first item and the second item, wherein a data structure for the combined item comprises a data substructure for the first item and a data substructure for the second item.

In Example 20, the subject matter of Example 19 includes, receiving a search request for a given item type from the inventory management data repository, wherein the given item type is associated with the first item, and wherein the given item type is not associated with the combined item; and providing neither the first item nor the combined item as a search result to the search request based on the first item having been combined with the second item into the combined item.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed is:

1. A system comprising:
   processing hardware of a server; and
   a memory storing instructions which, when executed by the processing hardware, cause the processing hardware to perform operations comprising:
   causing display of a presentation of an order form at a client computing device, the order form comprising a plurality of fields that include one or more of a type of item, an item identifier, a supplier identifier, a price, a payment method, or a delivery location;
   receiving a notification that an order for a new item is being placed via the order form displayed at the client computing device, the notification comprising at least an indication of the type of item being ordered;
   accessing a bid data repository in response to the receiving the notification that the order for the new item is being placed via the order form, the bid data repository comprising a plurality of supplier bids that comprise one or more of the item identifier, the supplier identifier, the price, or an expiration date;
   selecting, based on the indication of the type of item being ordered, a first supplier bid from among the plurality of supplier bids stored in the bid data repository;
   populating one or more fields of the presentation of the order form displayed at the client computing device based on the first supplier bid from among the plurality of supplier bids stored in the bid data repository;
   submitting the order based on the order form;

updating, upon determining that a delivery for the order has been completed, an inventory management data repository based on at least the delivery location and the item identifier;

receiving, via a graphical user interface presented at the client computing device, input representing that a first item residing at the delivery location is to be combined with a second item residing at the delivery location, the graphical user interface comprising a first region for specifying the first item and the second item, the first region overlaying a second region displaying a catalog of items;

removing, from the inventory management data repository, the first item and the second item in response to the input; and creating, in the inventory management data repository, a combined item that comprises both the first item and the second item, wherein a data structure for the combined item comprises a data substructure for the first item and a data substructure for the second item.

2. The system of claim 1, the operations further comprising:

receiving the plurality of supplier bids; and storing, in the bid data repository, the plurality of supplier bids.

3. The system of claim 1, the operations further comprising:

receiving, at the processing hardware, a search request for a given item type from the inventory management data repository, wherein the given item type is associated with the first item, and wherein the given item type is not associated with the combined item; and providing neither the first item nor the combined item as a search result to the search request based on the first item having been combined with the second item into the combined item.

4. The system of claim 1, the operations further comprising:

determining that an expiration date for a given bid has passed; and removing, from the bid data repository, the given bid.

5. The system of claim 1, wherein prepopulating, based on the first supplier bid, the one or more fields of the order form at the client computing device comprises prepopulating at least one of the item identifier, the supplier identifier, and the price, the operations further comprising:

receiving, from the client computing device, an indication of approval of the prepopulated fields; and receiving, from the client computing device, a value input for at least one field that was not prepopulated.

6. The system of claim 5, wherein the at least one field that was not prepopulated comprises the payment method or the delivery location.

7. The system of claim 1, wherein the server is directly connected to the bid data repository via a first data connection, wherein the server is directly connected to the inventory management data repository via a second data connection, wherein the server is connected to the client computing device via an external network, and wherein the first data connection and the second data connection do not pass through the external network.

8. A non-transitory machine-readable medium storing instructions which, when executed by a machine, cause the machine to perform operations comprising:

causing display of a presentation of an order form at a client computing device, the order form comprising a plurality of fields that include one or more of a type of item, an item identifier, a supplier identifier, a price, a payment method, or a delivery location;

receiving a notification that an order for a new item is being placed via the order form displayed at the client computing device, the notification comprising at least an indication of the type of item being ordered;

accessing a bid data repository in response to the receiving the notification that the order for the new item is being placed via the order form, the bid data repository comprising a plurality of supplier bids that comprise one or more of the item identifier, the supplier identifier, the price, or an expiration date;

selecting, based on the indication of the type of item being ordered, a first supplier bid from among the plurality of supplier bids stored in the bid data repository;

populating one or more fields of the presentation of the order form displayed at the client computing device based on the first supplier bid from among the plurality of supplier bids stored in the bid data repository;

submitting the order based on the order form;

updating, upon determining that a delivery for the order has been completed, an inventory management data repository based on at least the delivery location and the item identifier;

receiving, via a graphical user interface presented at the client computing device, input representing that a first item residing at the delivery location is to be combined with a second item residing at the delivery location, the graphical user interface comprising a first region for specifying the first item and the second item, the first region overlaying a second region displaying a catalog of items;

removing, from the inventory management data repository, the first item and the second item in response to the input; and creating, in the inventory management data repository, a combined item that comprises both the first item and the second item, wherein a data structure for the combined item comprises a data substructure for the first item and a data substructure for the second item.

9. The machine-readable medium of claim 8, the operations further comprising:

receiving the plurality of supplier bids; and storing, in the bid data repository, the plurality of supplier bids.

10. The machine-readable medium of claim 8, the operations further comprising:

receiving a search request for a given item type from the inventory management data repository, wherein the given item type is associated with the first item, and wherein the given item type is not associated with the combined item; and providing neither the first item nor the combined item as a search result to the search request based on the first item having been combined with the second item into the combined item.

11. The machine-readable medium of claim 8, the operations further comprising:

determining that an expiration date for a given bid has passed; and removing, from the bid data repository, the given bid.

12. The machine-readable medium of claim 8, wherein prepopulating, based on the first supplier bid, the one or more fields of the order form at the client computing device comprises prepopulating at least one of the item identifier, the supplier identifier, and the price, the operations further comprising:

receiving, from the client computing device, an indication of approval of the prepopulated fields; and receiving, from the client computing device, a value input for at least one field that was not prepopulated.

13. The machine-readable medium of claim 12, wherein the at least one field that was not prepopulated comprises the payment method or the delivery location.

14. The machine-readable medium of claim 8, wherein the server is directly connected to the bid data repository via a first data connection, wherein the server is directly connected to the inventory management data repository via a second data connection, wherein the server is connected to the client computing device via an external network, and wherein the first data connection and the second data connection do not pass through the external network.

15. A method comprising:

causing display of a presentation of an order form at a client computing device, the order form comprising a plurality of fields that include one or more of a type of item, an item identifier, a supplier identifier, a price, a payment method, or a delivery location;

receiving a notification that an order for a new item is being placed via the order form displayed at the client computing device, the notification comprising at least an indication of the type of item being ordered;

accessing a bid data repository in response to the receiving the notification that the order for the new item is being placed via the order form, the bid data repository comprising a plurality of supplier bids that comprise one or more of the item identifier, the supplier identifier, the price, or an expiration date;

selecting, based on the indication of the type of item being ordered, a first supplier bid from among the plurality of supplier bids stored in the bid data repository;

populating one or more fields of the presentation of the order form displayed at the client computing device based on the first supplier bid from among the plurality of supplier bids stored in the bid data repository;

submitting the order based on the order form;

updating, upon determining that a delivery for the order has been completed, an inventory management data repository based on at least the delivery location and the item identifier;

receiving, via a graphical user interface presented at the client computing device, input representing that a first item residing at the delivery location is to be combined with a second item residing at the delivery location, the graphical user interface comprising a first region for specifying the first item and the second item, the first region overlaying a second region displaying a catalog of items;

removing, from the inventory management data repository, the first item and the second item in response to the input; and creating, in the inventory management data repository, a combined item that comprises both the first item and the second item, wherein a data structure for the combined item comprises a data substructure for the first item and a data substructure for the second item.

16. The method of claim 15, further comprising:

receiving the plurality of supplier bids; and storing, in the bid data repository, the plurality of supplier bids.

17. The method of claim 15, further comprising:

receiving a search request for a given item type from the inventory management data repository, wherein the given item type is associated with the first item, and wherein the given item type is not associated with the combined item; and providing neither the first item nor the combined item as a search result to the search request based on the first item having been combined with the second item into the combined item.

\* \* \* \* \*